March 22, 1949. H. OSTERBERG ET AL 2,464,887
HEAT ABSORBING SCREEN FOR PROJECTORS
Filed Jan. 12, 1946
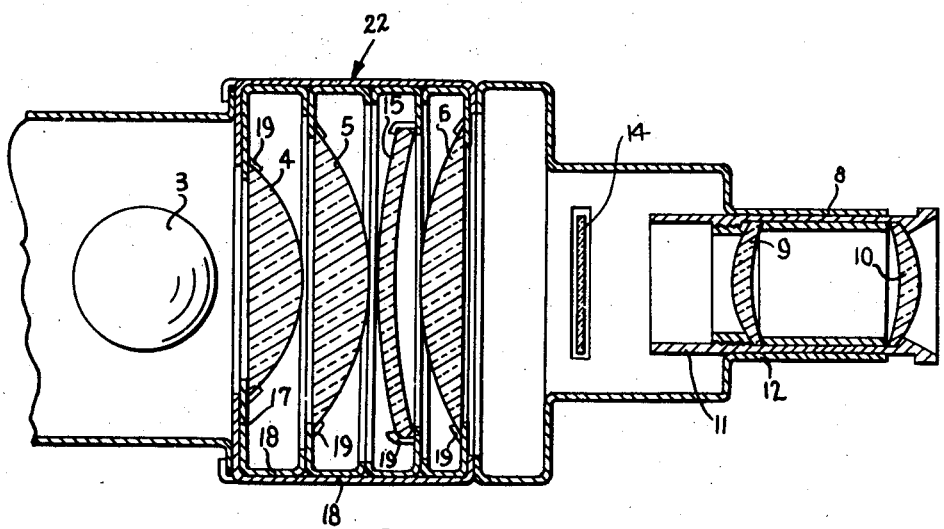
Fig. I
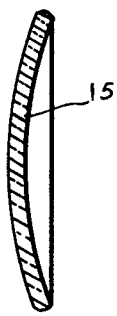
Fig. II
INVENTORS
HAROLD OSTERBERG
JOHN R. ROEBUCK
PHILIP W. COLLYER
BY Herbert C. Kimball
ATTORNEY Patented Mar. 22, 1949

2,464,887

UNITED STATES PATENT OFFICE 2,464,887

HEAT ABSORBING SCREEN FOR PROJECTORS

Harold Osterberg, Buffalo, N. Y., John R. Roebuck, Madison, Wis., and Philip W. Collyer, Buffalo, N. Y., assignors to American Optical Company, Southbridge, Mass., a voluntary association of Massachusetts Application January 12, 1946, Serial No. 640,722

3 Claims. (Cl. 88—24)

1

This invention relates to heat screens and more particularly to improved heat screens which absorb a sufficient proportion of the total energy in the beam of light being transmitted to give rise to the problems of high temperature and breakage incident to the dissipation of the heat so absorbed.

Heat screens are employed for protecting film, transparencies and other material which may be injured by excessive heat emanating from the source of illumination, whether in a projection system, a viewing system or other arrangement of optical elements requiring the use of intensive illumination.

Glasses have been developed for such heat screens which absorb a large proportion of the infra-red rays while transmitting a large proportion of the visible spectrum. They may or may not transmit in the ultra-violet as desired. As previously mentioned, a considerable problem arises in connection with dissipating the heat which is thus absorbed by this glass from the light beam being transmitted. As is well known, it is the infra-red rays which are the heat rays; and since the heat screens selectively absorb these heat rays, the temperature may rise well above 500° C. This is particularly true of efficient heat screens, one example being a glass which is now coming into commercial use and which absorbs in the neighborhood of 80 per cent or more of the total energy in the beam of light being transmitted. This is an alumina-phosphate glass containing a small proportion of silica and with a slight addition of iron oxide. Glasses of this general type are disclosed in Pincus Patent No. 2,359,789 granted October 10, 1944.

As is well known, the melting conditions during the production of this glass are so controlled as to keep the proper amount of iron in the ferrous form to give the absorption in the infra-red portion of the spectrum which renders this glass heat absorbing.

This particular glass has a coefficient of expansion in the neighborhood of $5.3 \times 10^{-6}$ as compared with a coefficient expansion of about $10 \times 10^{-6}$ for optical glass and a coefficient of about $4 \times 10^{-6}$ for the low expansion glasses sold under the name Pyrex.

As above mentioned, these heat screen glasses selectively absorb the heat rays; and in spite of great caution in handling and mounting the heat screen, a troublesome problem has arisen due to the breakage of these heat screens in use.

Accordingly, an object of our invention is to

2 render such heat screens more resistant to breakage.

In accordance with our invention the heat screen is given the form of a meniscus element substantially without focal power. The mere change of form of the heat screen from a flat plate to that of a meniscus element substantially without focal power has given striking results. Such results were obtained without any alterations in the wattage of the lamp used as the source of illumination. Thus in one optical system employed, where as many as seventy out of a hundred heat screens had failed under the usual test given prior to shipment from the factory, the modification of the form of these heat screens into meniscus elements as above described resulted in substantial elimination of this breakage under the same test.

There are theories as to why this striking result was obtained, but none is completely satisfactory. It is believed that the primary cause of breakage of the heat screen is due to compacting of the glass at the temperatures reached under operating conditions. The resulting strains are apparently more widely distributed, or the glass is more flexible so as to yield to these strains, when the heat screen is in the form of a meniscus element. Just what is the true explanation is not accurately known; but in any event, the difficulty with breakage was overcome due to the change to the meniscus form.

In thus referring to "meniscus" we mean that the opposed surfaces shall have approximately the same radius of curvature, this radius being not greater than 250 mm. We have found that excellent results are obtained with a meniscus element whose surfaces have radii of curvature of approximately 88 mm. and 85 mm. Extremely short radii below 30 mm. or the like interfere with the optical properties and components of the optical system and since they do not offer compensating advantages in the way of increased resistance to breakage, are to be avoided.

Moreover, although the surfaces will generally be spherical, due to the greater ease of grinding and polishing a spherical surface, one or both of the surfaces may also be aspheric, especially where such an aspheric surface imparts desirable properties to the lens system.

The heat screen element must have substantially no power. While the proportion of the visible spectrum which is transmitted is generally at least high as 70% and for improved glasses such as the one whose composition is above given the transmission of the visible spectrum may be in the neighborhood of 85%, these glasses do nevertheless have sufficient absorption so that a heat screen of uneven thickness gives rise to dark and light areas on the projection screen or in viewing. For instance, a positive lens which is thicker at the center than at the edges will give rise to a dark area in the central portion of the image.

Our improved heat screen is preferably employed with a mounting which maintains the entire area of the heat screen within the beam of light. In this way all portions of the heat screen are subjected to the heating effect of the light beam, thereby reducing temperature gradients within the mass of the glass of the heat screen.

In the drawings we have given simply for purposes of illustration one form of optical system in which our improvement may be employed:

Fig. 1 being a horizontal section through a projector of conventional design; and Fig. 2, a central section through the heat screen per se.

In the optical system illustrated in Fig. 1 the light from the electric lamp 3 is collected by the condensing lenses 4, 5 and 6 so as to be concentrated into a beam passing through the objective indicated in general by the numeral 8. The objective lenses shown conventionally at 9 and 10 are secured within a lens tube 11 which may be adjusted within the sleeve 12 for focusing the image on a screen (not shown).

For protecting the slide, film, or other material 14 being projected, a heat screen in the form of a meniscus element 15 of substantially no focal power is arranged in the optical system for absorbing heat emanating from the light source 3. This heat screen may be of glass having the chemical analysis set forth above, in which case it will absorb at least 75% and even as high as 85% of the total energy in the light beam passed to the objective 8.

Each of the condensing lenses 4, 5 and 6 and the heat screen 15 is mounted in a holder 17 having a flange 18 of suitable dimension for the correct spacing of the elements of the optical system. Clips 19, spaced about the periphery of each element loosely retain the respective element in its holder 17.

The lamp 3 and the elements 4, 5 and 6 together with the heat screen 15 are contained within a housing indicated in general by the numeral 22. As shown, the sleeve 12 is an extension at the forward portion of this housing 22.

Our improved heat screen may be employed in a wide variety of optical systems. Moreover, it is unimportant in which position with relation to the other elements of the system the heat screen is employed, although somewhat better results are obtained if the convex side of the meniscus shaped heat screen is toward the light source.

It will be understood therefore that while we have illustrated and described one embodiment which our invention may assume, the same may be otherwise embodied and practiced within the scope of the following claims.

We claim:

1. A heat screen lens for use in an optical projection system having an objective, a light source and condenser lens means in optical alignment and spaced relation so as to receive said heat screen lens, said heat screen lens being relatively thin and of meniscus shape having a radius of curvature lying substantially between 30 millimeters and 250 millimeters, said heat screen lens being of sufficient thickness however and formed of an alumina-phosphate type glass containing amounts of silica and iron oxide to provide an absorption of from approximately 75% to 85% of the total energy directed toward said heat screen lens while providing from approximately 70% to 85% transmission in the visible region of the spectrum.

2. A structure in accordance with claim 1 characterized in that the convex surface of the heat screen lens is positioned toward the light source when located in said projection system.

3. A structure in accordance with claim 1 characterized in that said alumina-phosphate glass has a relatively low coefficient of expansion in the neighborhood of approximately $5.3 \times 10^{-6}$.

HAROLD OSTERBERG.
JOHN R. ROEBUCK.
PHILIP W. COLLYER.

REFERENCES CITED

The following references are of record in the file of this patent:

UNITED STATES PATENTS

| Number | Name | Date |
| --- | --- | --- |
| 1,434,268 | Tillyer | Oct. 31, 1922 |

FOREIGN PATENTS

| Number | Country | Date |
| --- | --- | --- |
| 475,318 | France | Feb. 16, 1915 |
| 285,547 | Germany | July 6, 1915 |